United States Patent
Lee (10) Patent No.: US 11,463,597 B2
(45) Date of Patent: Oct. 4, 2022

(54) BELT TRANSFER TYPE MULTI-FUNCTION DEVICE AND CONTROL METHOD THEREOF

(71) Applicant: Myung Shin Lee, Gyeonggi-do (KR)

(72) Inventor: Myung Shin Lee, Gyeonggi-do (KR)

( * ) Notice: Subject to any disclaimer, the term of this patent is extended or adjusted under 35 U.S.C. 154(b) by 0 days.

(21) Appl. No.: 17/290,041

(22) PCT Filed: Nov. 1, 2019

(86) PCT No.: PCT/KR2019/014720
§ 371 (c)(1),
(2) Date: Apr. 29, 2021

(87) PCT Pub. No.: WO2020/091509
PCT Pub. Date: May 7, 2020

(65) Prior Publication Data
US 2021/0409563 A1    Dec. 30, 2021

(30) Foreign Application Priority Data

Nov. 1, 2018   (KR) .................... 10-2018-0133119
Nov. 1, 2019   (KR) .................... 10-2019-0138618

(51) Int. Cl.
*H04N 1/00*   (2006.01)

(52) U.S. Cl.
CPC ....... *H04N 1/00718* (2013.01); *H04N 1/0061* (2013.01); *H04N 1/0066* (2013.01); *H04N 1/00602* (2013.01); *H04N 1/00631* (2013.01)

(58) Field of Classification Search
CPC . G03G 2215/00755; G03G 2215/0164; G03G 2215/018; G03G 2215/0193;
(Continued)

(56) References Cited

U.S. PATENT DOCUMENTS

| | | | |
|---|---|---|---|
| 11,345,168 B2* | 5/2022 | Lee .................... | B41J 11/009 |
| 2008/0145081 A1* | 6/2008 | Woo .................... | G03G 15/0131 |
| | | | 399/66 |

(Continued)

FOREIGN PATENT DOCUMENTS

| | | |
|---|---|---|
| JP | 2005-255358 A | 9/2005 |
| JP | 2006-142677 A | 6/2006 |

(Continued)

OTHER PUBLICATIONS

International Preliminary Report on Patentability dated Apr. 27, 2021 in corresponding International Patent Application No. PCT/KR2019/014720.

(Continued)

*Primary Examiner* — Negussie Worku
(74) *Attorney, Agent, or Firm* — Fox Rothschild LLP (57) ABSTRACT

A belt transfer type multi-function device includes: a control device performing controlling such that an image to be printed on paper already caught between a transfer roller and the belt roller is printed, and if printing should not be performed on a next paper, movement of the next paper is stopped on a transfer path before the next paper is positioned between the transfer roller and the belt roller, the image already transferred on the transfer belt is deleted in a state in which the next paper is stopped on the transfer path, and the next paper in a stopped state is ejected as a blank paper through a ejection port along the transfer path, so that the image already transferred to the transfer belt, which is to be printed on the next paper along the movement direction of paper, is not printed on the next paper.

11 Claims, 7 Drawing Sheets

(58) Field of Classification Search
CPC ... G03G 2215/1623; G03G 2221/1657; G03G 15/50; G03G 2215/00139; B65H 2220/02; B65H 2511/13; B65H 2220/01; B65H 2513/10; B65H 2513/50; B65H 2513/514; B65H 2515/112; B65H 2220/03; B65H 2403/732; B65H 2404/2222; B65H 2404/253; B65H 2404/255; B65H 2513/108; B65H 3/0684; B65H 3/5261; B65H 5/026; B65H 5/062; B65H 5/068; B65H 2801/06; B65H 7/02; H04N 1/00; H04N 1/12; H04N 1/23
USPC .......................................................... 358/498
See application file for complete search history.

(56) References Cited

U.S. PATENT DOCUMENTS

| | | | |
|---|---|---|---|
| 2009/0231389 A1* | 9/2009 | Ishitoya | B41J 2/2103 347/40 |
| 2015/0264207 A1* | 9/2015 | Kitaichi | H04N 1/00798 358/434 |
| 2016/0251180 A1* | 9/2016 | Shinohara | B41J 11/0085 271/275 |
| 2017/0248872 A1* | 8/2017 | Kitamura | G03G 15/161 |
| 2021/0168616 A1* | 6/2021 | Mackey | H04L 27/0008 |
| 2021/0409563 A1* | 12/2021 | Lee | H04N 1/00 |
| 2022/0029251 A1* | 1/2022 | Bae | H01M 4/133 |

FOREIGN PATENT DOCUMENTS

| | | |
|---|---|---|
| JP | 2006-160484 A | 6/2006 |
| KR | 10-2012-0116067 A | 10/2012 |
| KR | 10-2013-0020019 A | 2/2013 |
| KR | 10-2016-0128519 A | 11/2016 |

OTHER PUBLICATIONS

Office Action dated Oct. 8, 2020 in corresponding Korean Patent Application No. 10-2019-0138618.
International Search Report dated Feb. 27, 2020 in corresponding PCT Patent Application No. PCT/KR2019/014720.
Office Action dated Jun. 14, 2022 in Japanese Application No. 2021-524293.

* cited by examiner

BELT TRANSFER TYPE MULTI-FUNCTION DEVICE AND CONTROL METHOD THEREOF

TECHNICAL FIELD

The present disclosure relates to a belt transfer type multi-function device and a control method thereof, and more particularly, to a belt transfer type multi-function device including a security paper detection sensor to discriminately print security paper and plain paper and to output plain paper as blank paper, and a control method thereof. In the present disclosure, the multi-function device includes even a device that implements only an individual function of a printer, a fax machine, a copier, and a scanner, as well as a multi-function device incorporating the functions of a printer, a fax machine, a copier, and a scanner.

BACKGROUND ART

Recently, with the rapid development of enterprises, security measures against document leakage of enterprises have been devised. In recent years, as security measures against document leakage, a document security technology employing security paper has been developed. Security paper refers to paper printed by inserting a special material therein or by using a special material, which generates a signal for distinguishing between characteristics of materials by resonating to a specific frequency using an amorphous or similar non-crystalline magnetic material (alloy), a metal wire in nanoscale, and a material having magnetic resonance characteristics.

Such security paper is detected by an electromagnetic (EM) sensor. That is, when a soft magnetic material in the security paper approaches an alternating current (AC) magnetic field generated by the sensor, the AC magnetic field changes, and a high frequency spectrum generated due to the change is detected to detect the security paper. The sensor may include a transmission coil generating an AC magnetic field, a reception coil detecting a change in the AC magnetic field generated by the transmission coil, and an electronic system controlling the AC magnetic field generated by the transmission coil and processing a signal received from the reception coil.

Alternatively, security paper may include a plurality of conductive fine metal pieces irregularly distributed throughout the paper. The fine metal piece may be any type of metal as long as it has conductivity and generates an induced current in a magnetic field. For example, the metal piece contained in the paper may have a fine size so that it is not easily identified by the naked eyes of a user. For example, the metal piece may be a metal piece having a thickness of 0.1 µm to 3 µm, a length of 0.3 cm to 4 cm, and a width of 0.1 mm to 0.5 mm. As such, with the security paper in which the conductive fine metal pieces are scattered, a primary magnetic field generated by an inductive sensor induces an eddy current in the fine metal pieces of a fed paper, and a magnetic field secondarily generated by the eddy current affects the primary magnetic field generated by the inductive sensor to change intensity thereof. Accordingly, the inductive sensor transmits a security paper detection signal to a control device to be described later according to whether intensity of the magnetic field generated by the inductive sensor itself changes.

Figure 1:
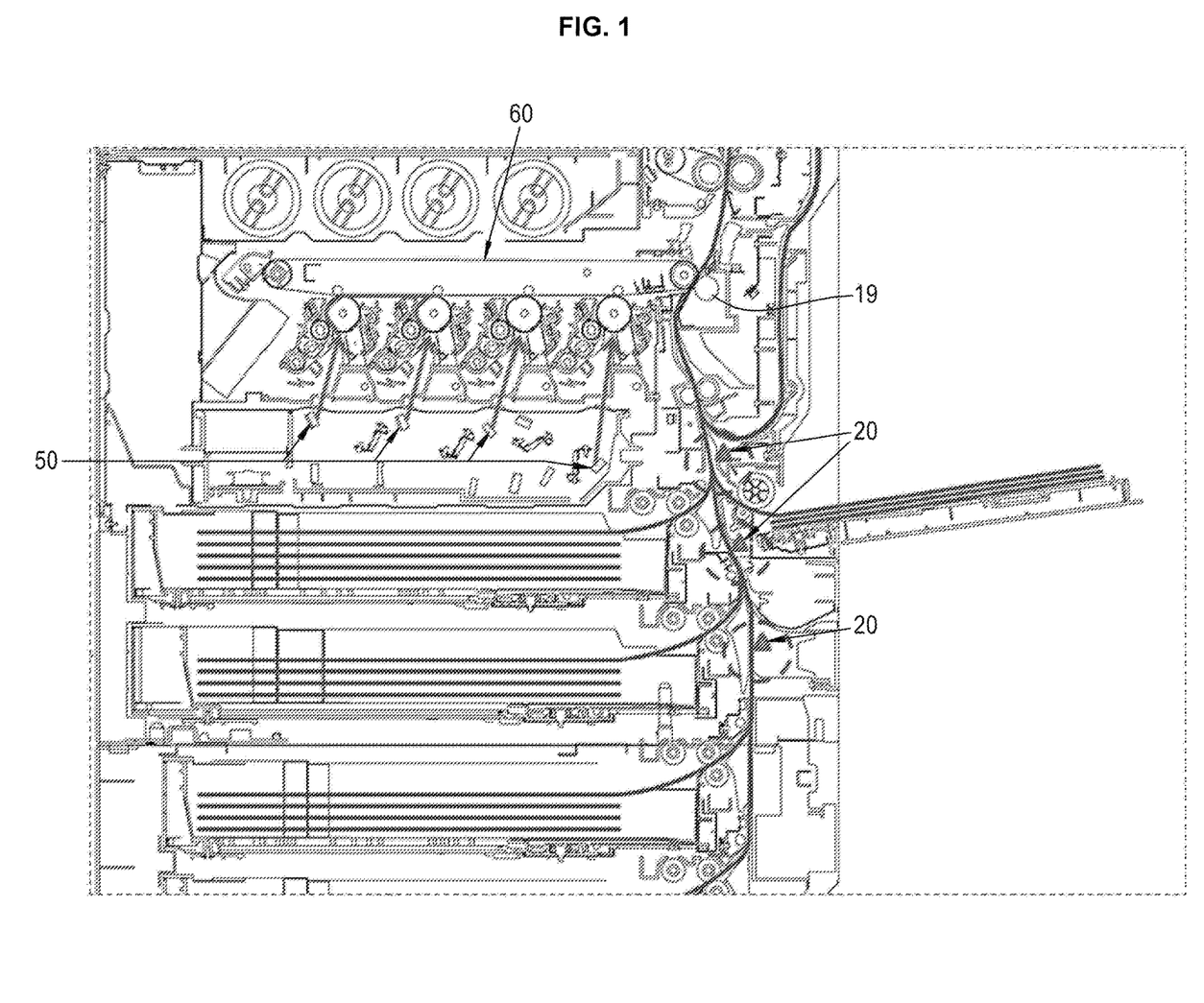
FIG. 1 is a view for explaining the background art of the present disclosure in a belt transfer type multi-function device.
Figure 2:
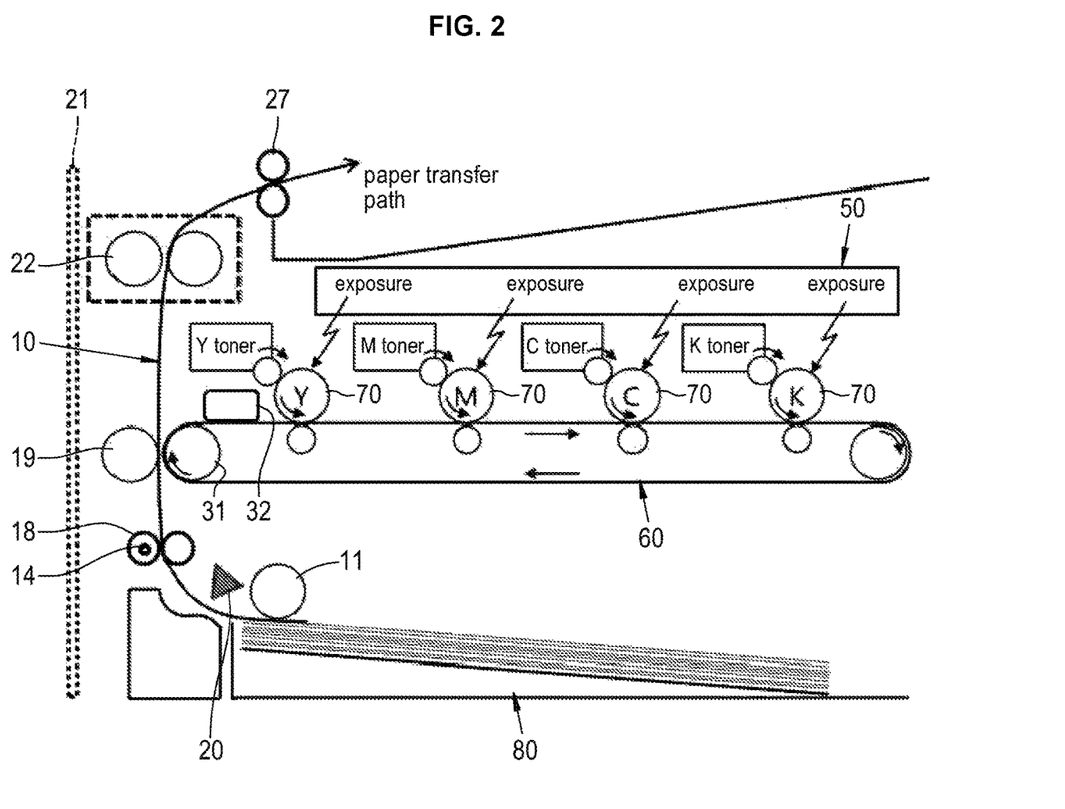
FIG. 2 is a view for explaining the background art of the present disclosure in a belt transfer type multi-function device.

FIGS. 1 and 2 are diagrams illustrating a background art of the present disclosure regarding a belt transfer type multi-function device that may be applied to a multi-function device for security paper. A general process of printing paper in a belt transfer type multi-function device will be described with reference to FIGS. 1 and 2. Once printing starts, a laser scanner unit (LSU) 50 irradiates a laser to an OPC drum 70 according to an image to be printed, to form an image on the OPC drum 70, the OPC drum 70 on which the image is formed comes into contact with a roller to which a toner is attached, and the toner is attached only to a portion of the OPC drum 70 in which the image is formed due to a potential difference between voltages applied to the roller and the drum. The OPC drum 70 to which the toner is attached comes into contact with a transfer belt 60 so that the toner attached to the OPC drum 70 is moved to the transfer belt 60 due to a potential difference applied between the OPC drum 70 and the transfer belt 60. For example, in the case of a color printer, each color toner is moved to the transfer belt 60 in order of yellow (Y), magenta (M), cyan (C), and black (K). For reference, the order of the colors may differ depending on a multi-function device maker. The toner moved to the transfer belt 60 meets the paper lifted from a feeding device between the transfer belt 60 and a transfer roller 19 according to a rotational motion of the transfer belt 60, and as the toner of the transfer belt 60 is moved to a paper 10 according to a potential difference between the transfer belt 60 and the transfer roller 19, an image is formed on the paper 10. As the paper 10 on which the image has been formed by the toner passes through a fuser unit 22, the toner is fused to the paper 10 by heat, thereby finishing a final printing process.

In the printing process of the belt transfer type multi-function device described above, printing is first performed (image is formed) on the transfer belt 60 before the paper 10 is picked up by a pickup roller 11 in a paper tray 80, and in both a case in which the security paper detection sensor 20 is installed in the paper tray 80 and a case in which the security paper detection sensor 20 is installed on a transfer path of the paper 10 as shown in FIG. 2, whether the paper 10 is a security paper or a plain paper may be detected only when the paper 10 is picked up and the picked-up paper is moved from the transfer path. Here, there is no particular problem when the security paper is detected, but when the plain paper is detected, there is a problem in that the image formed on the transfer belt 60 is already transferred to the plain paper and printed, before being detected.

DISCLOSURE

Technical Problem

An aspect of the present disclosure provides a belt transfer type multi-function device and a control method thereof, capable of ejecting paper without printing an image formed on a transfer belt on the paper in any event.

Another aspect of the present disclosure provides a belt transfer type multi-function device for security paper and a control method thereof, capable of performing printing by distinguishing between security paper and plain paper by applying a security paper detection sensor and ejecting paper without forming an image thereon when paper is detected as plain paper.

Technical Solution

According to an aspect of the present disclosure, there is provided a belt transfer type multi-function device for printing an image transferred on a belt to paper moving between a transfer roller and a belt roller, including: a control device performing controlling such that an image to be printed on paper already caught between the transfer roller and the belt roller is printed as it is, and if printing should not be performed on next paper along a movement direction of paper, movement of the next paper is stopped on a transfer path of paper before the next paper is positioned between the transfer roller and the belt roller, the image already transferred on the transfer belt is deleted in a state in which the next paper is maintained to be stopped on the transfer path of paper, and the next paper in a stopped state is ejected as a blank paper through a ejection port of printed paper along the transfer path of paper, so that the image already transferred to the transfer belt, which is to be printed on the next paper along the movement direction of paper, is not printed on the next paper.

In addition, the control device may control the next paper to be stopped from moving before being caught between the transfer roller and the belt roller, after the next paper is picked up by a pickup roller.

In addition, one or more of a feed roller and a registration roller for correcting a skew of fed paper and a driving unit including a clutch or motor for driving the one or more rollers may be provided between the pickup roller and the transfer roller, and the control device may control the driving unit to stop movement of the paper before the next paper is caught between the transfer roller and the belt roller.

In addition, the control device may turn off a clutch of the feed roller so that printing is normally performed on the paper already caught between the transfer roller and the belt roller, and the control device may turn on the clutch of the feed roller after the lapse of a predetermined time to eject the next paper as blank paper.

In addition, the belt transfer type multi-function device may further include: a second feed clutch switch connected to the clutch of the feed roller, a printer feed clutch switch connected to the second feed clutch switch, and a first feed clutch switch, wherein the control device may control ON/OFF of the first feed clutch switch and the second feed clutch switch.

In addition, the control device may control ON/OFF of each of a door open sensor switch, a feed sensor switch, an exit sensor switch, and a bin full sensor switch to control the next paper stopped from moving to be ejected as blank paper through the ejection port along a transfer path of paper.

In addition, the belt transfer type multi-function device may further include: a security paper detection sensor installed on the transfer path of paper starting from a paper tray, wherein the control device may determine whether corresponding paper is security paper according to a detection value from the security paper detection sensor, and perform control such that security paper is normally printed and plain paper is ejected as blank paper.

In addition, the control device may compare a first detection value detected by the security paper detection sensor at a time point at which there is no corresponding paper near the security paper detection sensor with at least one second detection value detected by the security paper detection sensor for paper to be determined on the transfer path during a process in which the paper to be determined is transferred on the transfer path, and the control device may determine that the corresponding paper is security paper if a comparison value is equal to or greater than a predetermined reference, and the control device may determine that the corresponding paper is plain paper if the comparison value is smaller than the predetermined reference.

A control method of a belt transfer type security multi-function device, which determines whether paper fed on a transfer path of paper starting from a paper tray is security paper or plain paper and prints an image transferred to a belt on paper moving between a transfer roller and a belt roller, includes: printing an image to be printed on security paper already caught between the transfer roller and the belt roller as it is; stopping, if next paper is determined as plain paper along a movement direction of paper, movement of the plain paper on the transfer path of paper before the plain paper is caught between the transfer roller and the belt roller so that the image, which is already transferred to the transfer belt and which is to be printed on the plain paper along the movement direction of paper, is not printed on the plain paper; deleting the image already transferred to the transfer belt in a state in which the plain paper stopped on the transfer path of paper is maintained; and subsequently ejecting the stopped plain paper, as blank paper, through a ejection port of printed paper along the transfer path of paper.

Here, the plain paper may be controlled to be stopped from moving before being caught between the transfer roller and the belt roller, after picked up by a pickup roller.

Here, at least one of a feed roller and a registration roller for correcting a skew of fed paper and a driving unit including a clutch or a motor for driving a corresponding roller may be provided between the pickup roller and the transfer roller, and the driving unit may be controlled to stop movement of the plain paper before the plain paper is caught between the transfer roller and the belt roller.

Here, printing may be normally performed on the security paper already caught between the transfer roller and the belt roller by turning off a clutch of the feed roller, and the plain paper may be ejected as blank paper by turning on the clutch of the feed roller after the lapse of a predetermined time.

Here, a second feed clutch switch connected to the clutch of the feed roller and a first feed clutch switch and a printer feed clutch switch connected to the second feed clutch switch may be additionally provided, and ON/OFF of the first feed clutch switch and the second feed clutch switch may be controlled.

Here, the stopped plain paper may be ejected as blank paper through the ejection port along the transfer path of paper by controlling ON/OFF of each of a door open sensor switch, a feed sensor switch, an exit sensor switch, and a bin full sensor switch.

Here, a first detection value detected by the security paper detection sensor at a time point at which there is no corresponding paper near the security paper detection sensor may be compared with at least one second detection value detected by the security paper detection sensor for paper to be determined on the transfer path during a process in which the paper to be determined is transferred on the transfer path, and the corresponding paper may be determined as security paper if a comparison value is equal to or greater than a predetermined reference, and the corresponding paper may be determined as plain paper if the comparison value is smaller than the predetermined reference.

Advantageous Effects

According to the present disclosure, in a case in which an image transferred to a transfer belt should not be printed on paper (next paper or plain paper) immediately before being caught between the transfer roller and a belt roller in a belt transfer type multi-function device in any event, it is possible to normally perform printing on paper (or security paper) caught between the transfer roller and the belt roller and to eject the next paper or plain paper as blank paper without being printed.

BEST MODES

As described above, a multi-function device in the present disclosure includes not only a multi-function device incorporating functions of a printer, a fax machine, a copier, and a scanner but also a device that implements only individual functions of a printer, a fax machine, a copier, and a scanner. In general, a multi-function device refers to a device capable of implementing all the functions of a printer, a fax machine, a copier, and a scanner; however, in the present disclosure, as can be noted from the following descriptions, whether fed paper is plain paper or security paper is determined and a printing operation is performed accordingly, and thus, the multi-function device in the present disclosure may also be understood as indicating a printer, a fax machine, or a copier, not a multi-function device. That is, although a device functions only as a printer or only as a copier, if the functions described below in the present disclosure are implemented according to paper to be fed, the device will fall within the scope of the present disclosure. Alternatively, a related art multi-function device implementing all of the above functions will naturally fall within the scope of the present disclosure.

Hereinafter, an example in which security paper or plain paper is determined by a security paper detection sensor and printing is normally performed on security paper and is not performed on plain paper will be described, but the present disclosure is not limited thereto and may also be applied to a case in which an image already transferred to a transfer belt should not be printed on paper (hereinafter, referred to as "next paper" or "plain paper") immediately before being caught between a transfer roller and a belt roller in a belt transfer type multi-function device in any event. That is, printing may be normally performed on paper (which may be "security paper" according to an embodiment of the present disclosure) caught between the transfer roller and the belt roller, and next paper or plain paper, on which printing is not performed, is ejected as blank paper. In other words, the present disclosure may be applied to a case in which printing is normally performed on paper already caught between the transfer roller and the belt roller, while an image already transferred to the transfer belt should not be printed on next paper. Therefore, the scope of the present disclosure should not be limited by the description of the embodiments below but will be defined only by the claims described below.

Figure 3:
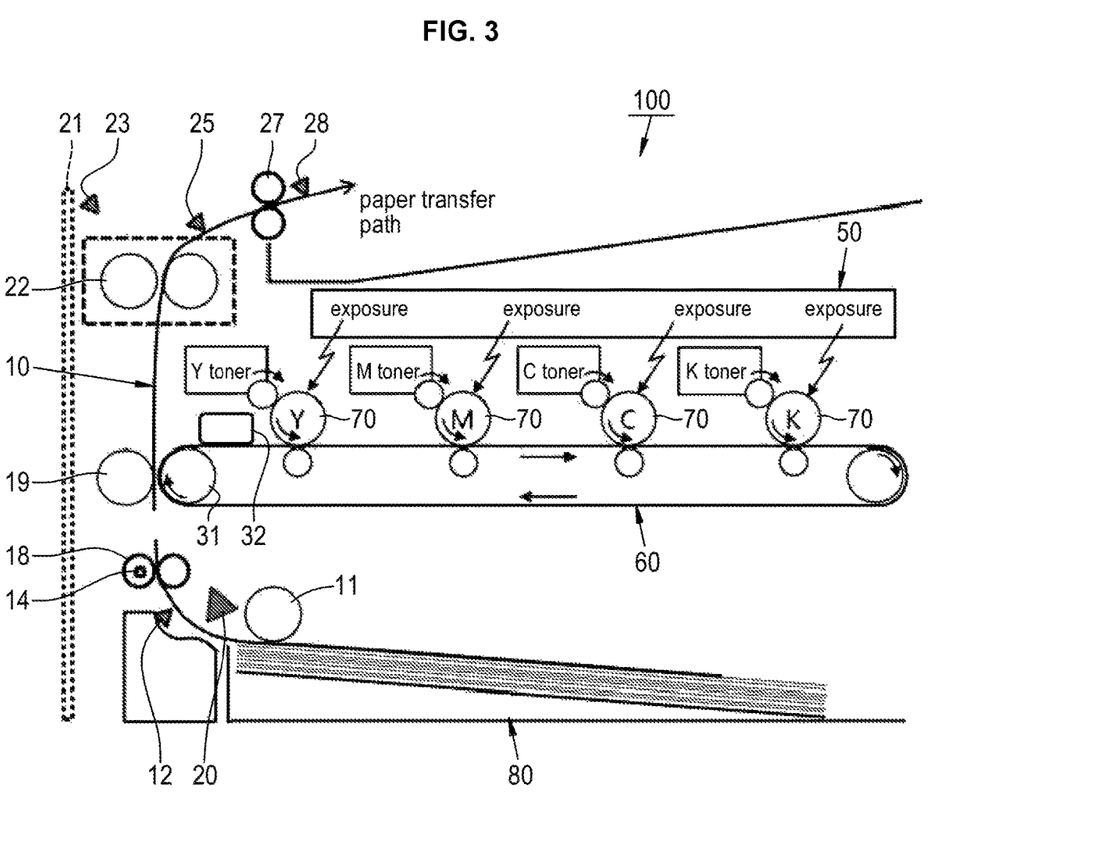
FIG. 3 is a view illustrating a paper transfer path and plain paper ejection operation in the belt transfer type multi-function device according to an embodiment of the present disclosure.
Figure 4:
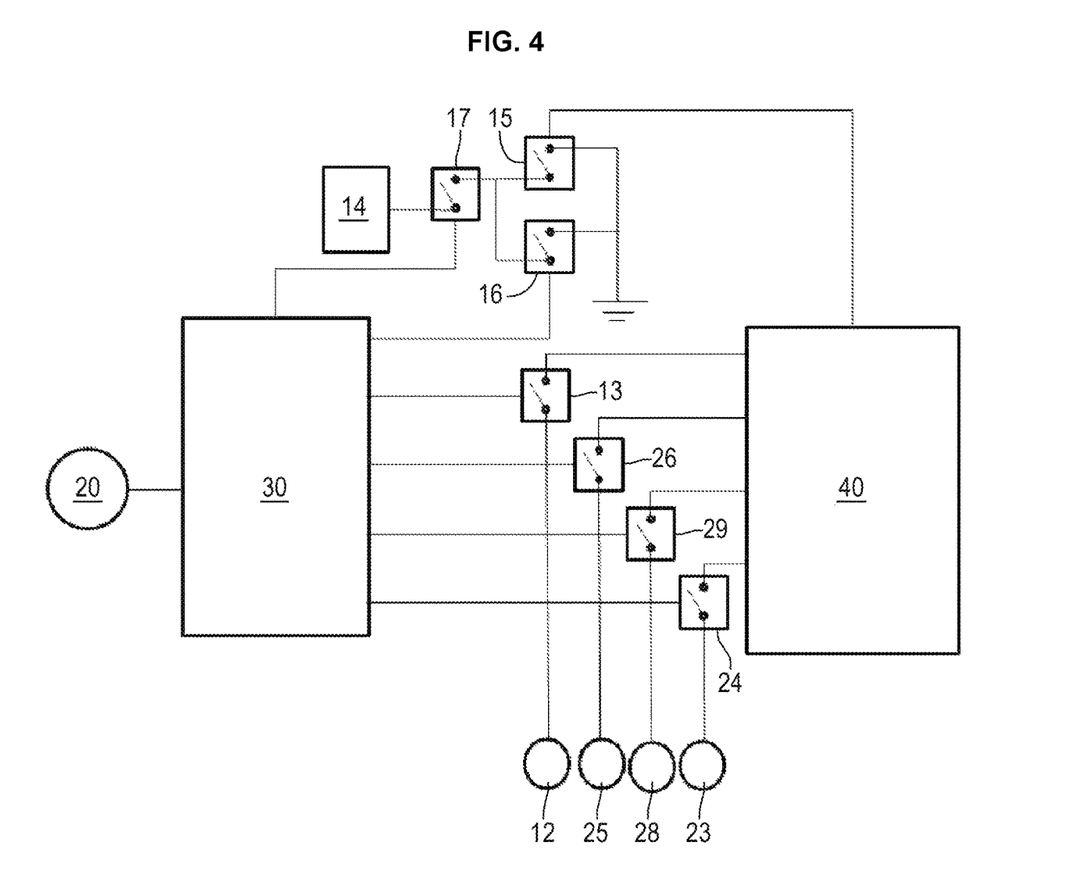
FIG. 4 is a block diagram illustrating an operation of ejecting plain paper in a belt transfer type multi-function device according to an embodiment of the present disclosure.
Figure 5:
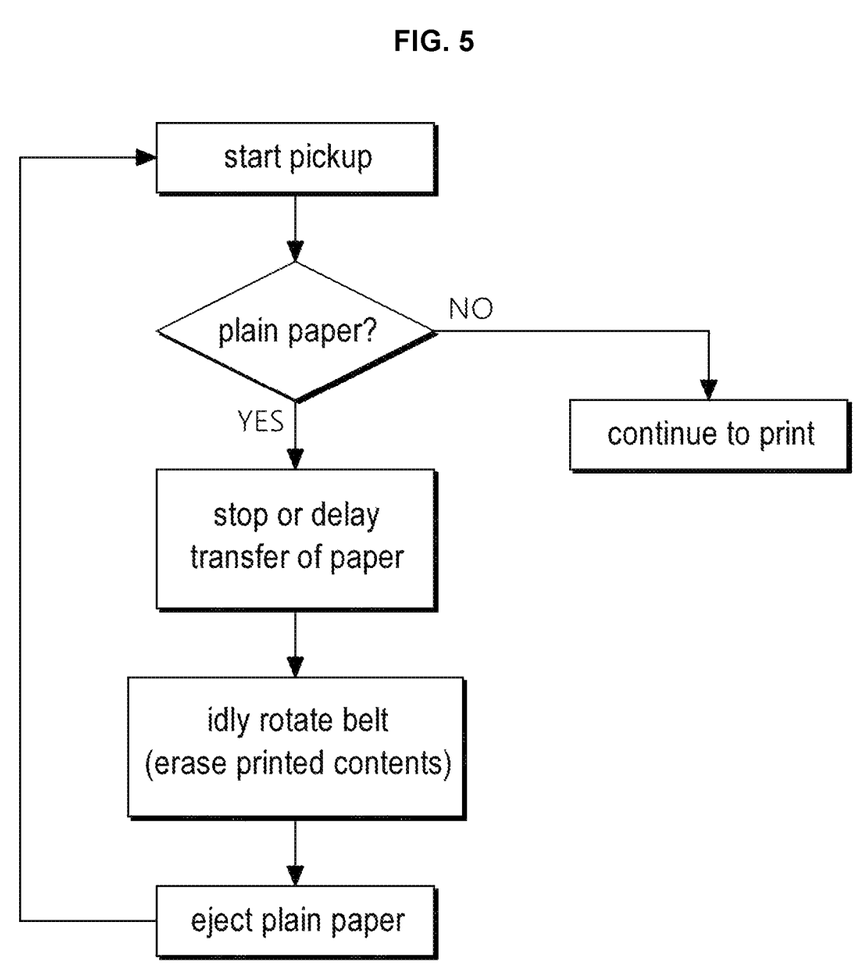
FIG. 5 is a flowchart illustrating an operation of ejecting plain paper in of a belt transfer type multi-function device according to an embodiment of the present disclosure.

FIG. 3 is a view illustrating a paper transfer path and plain paper ejection operation in the belt transfer type multi-function device according to an embodiment of the present disclosure. FIG. 4 is a block diagram illustrating an operation of ejecting plain paper in a belt transfer type multi-function device according to an embodiment of the present disclosure. FIG. 5 is a flowchart illustrating an operation of ejecting plain paper in of a belt transfer type multi-function device according to an embodiment of the present disclosure.

Referring to FIGS. 3 to 5, a belt transfer type multi-function device 100 according to the present disclosure includes a security paper detection sensor 20 installed on a transfer path of a paper 10 and a control device 30 determining whether the paper 10 is security paper or plain paper according to a detection value from the security paper detection sensor 20. When the paper 10 is recognized as plain paper, the belt transfer type multi-function device 100 turns off a feed roller clutch 14, and after the lapse of a predetermined time, the belt transfer type multi-function device 100 turns on the feed roller clutch 14 so that the paper 10 is output as blank paper. Hereinafter, the belt transfer type multi-function device 100 according to the present disclosure will be described in detail with reference to the accompanying drawings.

When the paper 10 is picked up by a pickup roller 11 from a paper tray 80 and transferred along a transfer path (indicating a path along which the paper, starting from the paper tray, is fed, printed and ejected from the inside of the multi-function device), the security paper detection sensor 20 located on the transfer path transmits a detection value to the control device 30 and the control device 30 compares the detection value from the security paper detection sensor 20 with a predetermined reference value to determine whether the paper 10 is security paper. According to an embodiment of the present disclosure, the control device 30 compares a first detection value detected by the security paper detection sensor 20 at a time point at which the corresponding paper 10 is not present near the security paper detection sensor 20 in the process in which the paper 10 to be determined is transferred on the transfer path with at least one second detection value detected by the security paper detection sensor 20 for the paper 10 to be determined on the transfer path, and if a comparison value is equal to or greater than the predetermined reference value, the control device 30 determines that the paper 10 is security paper, whereas if the comparison value is less than the predetermined reference, the control device 30 determines that the paper 10 is plain paper.

In some cases, the security paper detection sensor 20 may be provided in a predetermined position inside the paper tray 80 to detect whether the paper, included in the paper tray 80 and starting to be fed, is security paper or plain paper.

When the control device 30 recognizes the paper 10 as a plain paper, a feed roller clutch 14 may be turned off by firmware or the control device 30 of the belt transfer type multi-function device 100 to forcibly stop rotation of the feed roller 18. When rotation of the feed roller 18 is stopped, the transfer belt 60 continues to rotate with no paper 10 between the transfer roller 19 and the belt roller 31 so that the image already transferred to the transfer belt 60 may be automatically erased by a belt cleaner 32, while security paper (paper already caught between the transfer roller and the belt roller) in front of plain paper on the transfer path is normally printed and ejected.

In general, in a method of stopping transfer of the paper 10, if a jam signal is generated by controlling a feed sensor 12 of the belt transfer type multi-function device 100 or by processing a signal thereof or by controlling a door open sensor 23 or by processing a signal thereof, all operations of the belt transfer type multi-function device 100 may be stopped, and in this case, the front security paper, which has been normally printed, may also be stopped and damaged by heat of a fusing device (or an image printed on the security paper may be damaged). Therefore, in the present disclosure, when the firmware or the control device 30 recognizes (determines) the next paper 10, immediately before being caught between the transfer roller 19 and the belt roller 31, as plain paper, an OFF signal is forcibly generated by controlling a feed roller clutch 14 by the firmware or the control device 30 of the belt transfer type multi-function device 100 according to the present disclosure to thereby prevent a printer engine controller 40 of the belt transfer type multi-function device 100 from recognizing that the next paper 10 or plain paper is stopped, and thus, a normal printing process may be completed on the security paper (already caught between the transfer roller and the belt roller) in front of plain paper on the transfer path.

Thereafter, when a printer engine controller 40 recognizes that the door 21 is opened and then closed by controlling the door open sensor 23 (or by processing a signal thereof) (in the present disclosure, controlling a sensor includes processing a signal from the sensor) by the firmware or the control device 30 of the belt transfer type multi-function device 100 according to the present disclosure, the belt transfer type multi-function device 100 according to the present disclosure performs an initiation operation by the printer engine controller 40. Here, the printer engine controller 40 recognizes that there is no paper by controlling sensors (or by processing or controlling signals thereof) including the feed sensor 12 on the paper transfer path by the firmware or the control device 30 of the belt transfer type multi-function device 100 according to the present disclosure, and here, plain paper is normally ejected when the belt transfer type multi-function device 100 performs the initiation operation by turning on the feed roller clutch 14 by the firmware or the control device 30 of the belt transfer type multi-function device 100.

Here, in order to enable the belt transfer type multi-function device 100 according to the present disclosure to maintain the initial operation, the feed sensor 12, an exit sensor 25, a bin full sensor 29 through which plain paper passes are controlled by the firmware or the control device 30 of the belt transfer type multi-function device 100 according to the present disclosure so that the printer engine controller 40 may recognize that paper does not pass (there is no paper on the transfer path) until plain paper is ejected (alternatively, controlled by processing signals from the corresponding sensors). Details thereof will be described hereinbelow with reference to FIGS. 6 and 7.

In addition, in an embodiment of the present disclosure, a second feed clutch switch 17 connected to the feed roller clutch 14 and a printer feed clutch switch 15 and a first feed clutch switch 16 connected to the second feed clutch switch 17 are provided, and ON/OFF of the first feed clutch switch 16 and the second feed clutch switch 17 are controlled by the firmware or the control device 30 of the security multi-function device 100. Details thereof will be described hereinbelow with reference to FIGS. 6 and 7. The printer feed clutch switch 15 is controlled by the printer engine controller 40.

Figure 6:
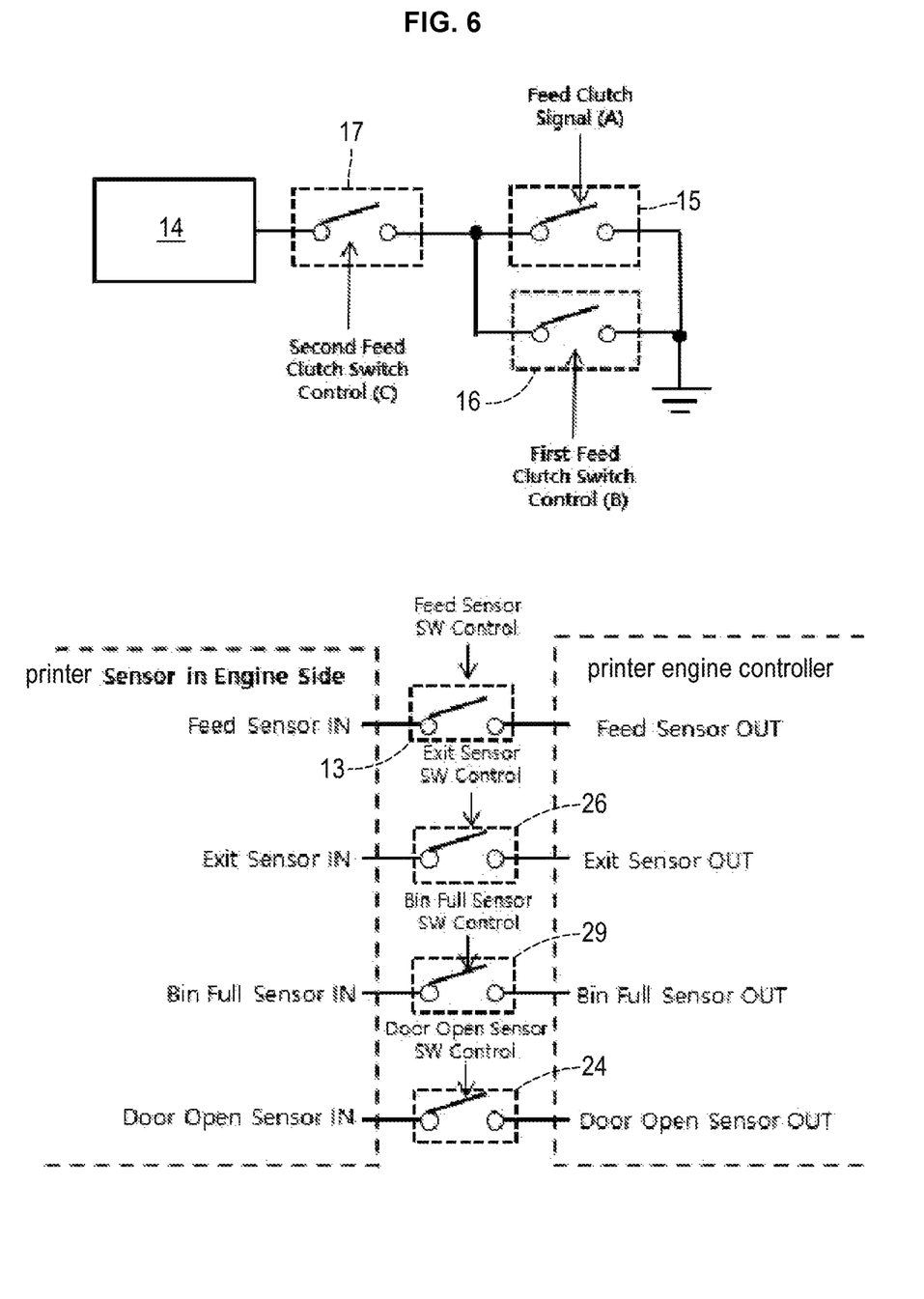
FIG. 6 is a view illustrating switching control for an operation of ejecting plain paper in a belt transfer type multi-function device according to an embodiment of the present disclosure.
Figure 7:
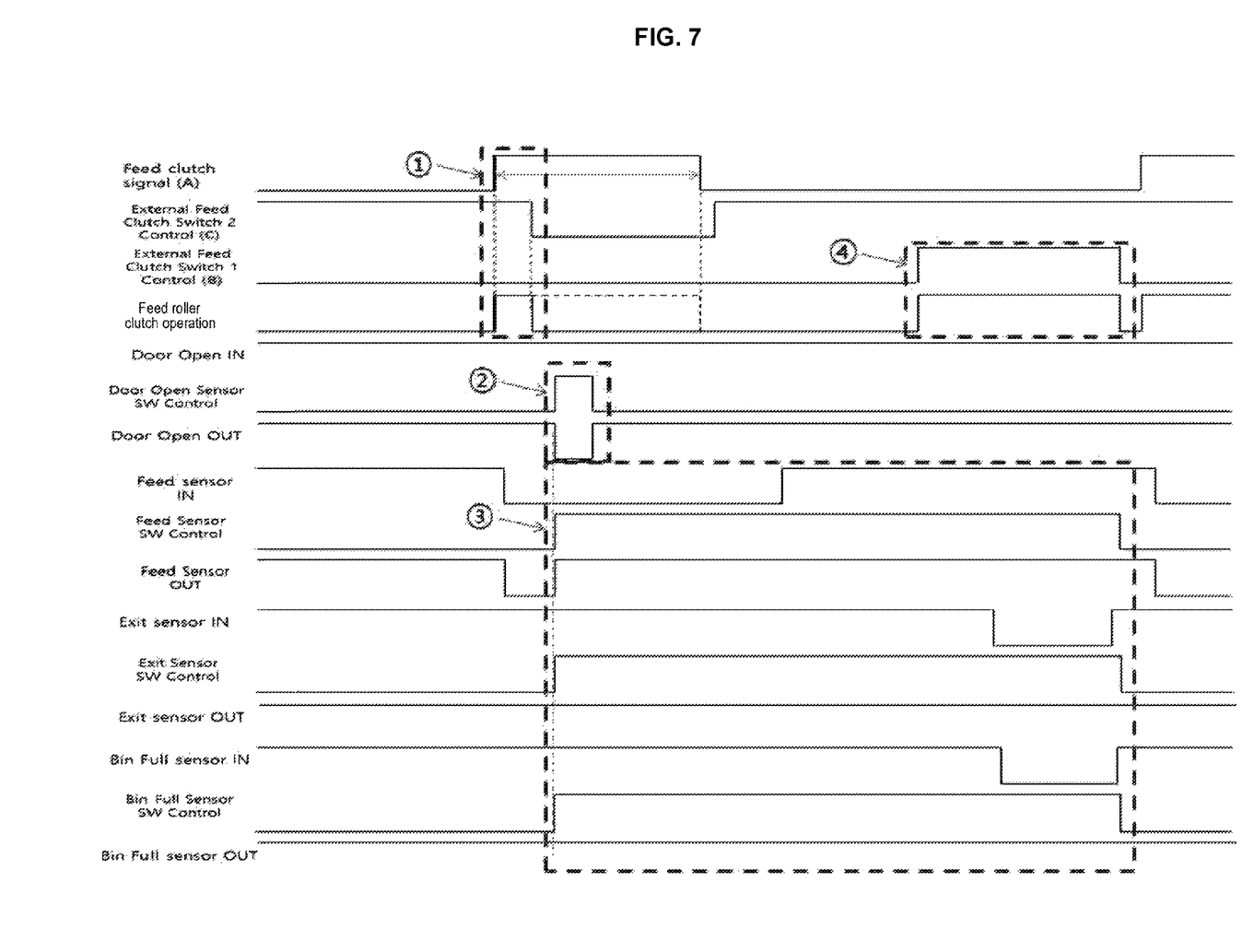
FIG. 7 is a timing chart illustrating switching control for an operation of ejecting plain paper in a belt transfer type multi-function device according to an embodiment of the present disclosure.

FIG. 6 is a view illustrating switching control for an operation of ejecting plain paper in a belt transfer type multi-function device according to an embodiment of the present disclosure, and FIG. 7 is a timing chart illustrating switching control for an operation of ejecting plain paper in a belt transfer type multi-function device according to an embodiment of the present disclosure.

An operation of controlling ON/OFF of the feed roller clutch and each sensor in the belt transfer type multi-function device 100 according to the present disclosure will be described in detail by a the timing chart with reference to FIGS. 6 and 7. In the timing chart of FIG. 7, in a section ①, the printer feed clutch switch 15 is controlled by a feed clutch signal from the printer engine controller 40 and is turned on (ON). When paper is recognized as plain paper, a second feed clutch switch control (C) is formed low by the firmware or the control device 30 of the security multi-function device 100, so that the second feed clutch switch 17 is blocked, an operation of the feed roller clutch 14 is turned off, the feed roller 18 does not rotate, and thus, paper is stopped on the transfer path.

Here, in a section of ②, when the door open sensor switch control is turned off and then turned on by the firmware or the control device 30 of the security multi-function device 100, door open OUT transferred to the printer engine controller 40 is dropped to low and then returned to high although there is no change (closed) actually in the door 21 like a state of door open IN, so that the printer engine controller 40 recognizes that the door 21 is opened and then closed, the belt transfer type multi-function device 100 starts an initialization operation (motors inside the belt transfer type multi-function device 100 are all rotated to erase the remaining image of the transfer belt 60 and the initialization operation is performed).

Here, as in the section of ③, when outputs of all sensors (feed sensor 12, exit sensor 25, and bin full sensor 28) on the paper transfer path are turned off by feed sensor switch control, exit sensor switch control, bin full sensor switch control by the firmware or the control device 30 of the security multi-function device 100 from a time point at which door open sensor switch control is dropped to low to a time point at which the initialization operation is finished, the printer engine controller 40 determines that there is no paper in spite of the presence of paper in the belt transfer type multi-function device 100 and continuously performs the initialization operation.

Here, since all the motors of the belt transfer type multi-function device 100 rotate, when a first feed clutch switch control (B) is made high by the firmware or the control device 30 of the security multi-function device 100 to turn on the first feed clutch switch 16 as in a section ④, the feed roller 18 rotates to transfer the paper 10 inside the belt transfer type multi-function device 100 to eject the paper 10 to the outside.

In the above case, all the driving motors required for transfer of the paper rotate during the initialization operation, but in some cases, some of the motors required for transfer of the paper may not rotate during the initialization operation depending on types of multi-function devices. In this case, plain paper may be ejected by transferring paper by rotating a motor which does not rotate during the initialization operation. Motors currently used in multi-function devices are mostly classified into two types of step motors and blushless DC (BLDC) motors, and the same controlling may be performed by controlling drivers thereof. Specifically, the control in the sections ① to ④ above may be followed as is, and if a motor does not rotate, a multi-function device side motor control signal may be interrupted by turning on P/S switch control, the motor may be rotated by connecting a sensor side motor control signal, whereby paper may be ejected to the outside.

The present disclosure is not limited to the specific embodiments described above and may be variously modified by a person skilled in the art to which the present disclosure pertains without departing from the gist of the present disclosure claimed in the claims and such changes will fall within the scope of the description of the claims.

INDUSTRIAL APPLICABILITY

According to the present disclosure, in a case in which an image transferred to a transfer belt should not be printed on paper (next paper or plain paper) immediately before being caught between the transfer roller and a belt roller in a belt transfer type multi-function device in any event, it is possible to normally perform printing on paper (or security paper) caught between the transfer roller and the belt roller and to eject the next paper or plain paper as blank paper without being printed.

The invention claimed is:

1. A belt transfer type multi-function device for printing an image transferred on a belt to paper moving between a transfer roller and a belt roller, the belt transfer type multi-function device comprising:
    a control device performing controlling such that an image to be printed on paper already caught between the transfer roller and the belt roller is printed as it is, and if printing should not be performed on next paper along a movement direction of paper, movement of the next paper is stopped on a transfer path of paper before the next paper is positioned between the transfer roller and the belt roller, the image already transferred on the transfer belt is deleted in a state in which the next paper is maintained to be stopped on the transfer path of paper, and the next paper in a stopped state is ejected as a blank paper through a ejection port of printed paper along the transfer path of paper, so that the image already transferred to the transfer belt, which is to be printed on the next paper along the movement direction of paper, is not printed on the next paper,
    wherein the control device controls the next paper to be stopped from moving before being caught between the transfer roller and the belt roller, after the next paper is picked up by a pickup roller, and
    wherein one or more of a feed roller and a registration roller for correcting a skew of fed paper and a driving unit including a clutch or motor for driving the one or more rollers are provided between the pickup roller and the transfer roller, and the control device controls the driving unit to stop movement of the paper before the next paper is caught between the transfer roller and the belt roller.

2. The belt transfer type multi-function device of claim 1, wherein the control device turns off a clutch of the feed roller so that printing is normally performed on the paper already caught between the transfer roller and the belt roller, and the control device turns on the clutch of the feed roller after the lapse of a predetermined time to ejection the next paper as blank paper.

3. The belt transfer type multi-function device of claim 2, further comprising:
    a second feed clutch switch connected to the clutch of the feed roller, a printer feed clutch switch connected to the second feed clutch switch, and a first feed clutch switch,
    wherein the control device controls ON/OFF of the first feed clutch switch and the second feed clutch switch.

4. The belt transfer type multi-function device of claim 2, wherein the control device controls ON/OFF of each of a door open sensor switch, a feed sensor switch, an exit sensor switch, and a bin full sensor switch to control the next paper stopped from moving to be ejected as blank paper through the ejection port along a transfer path of paper.

5. The belt transfer type multi-function device of claim 1, further comprising:
    a security paper detection sensor installed on the transfer path of paper starting from a paper tray,
    wherein the control device determines whether corresponding paper is security paper according to a detection value from the security paper detection sensor, and performs control such that security paper is normally printed and plain paper is ejected as blank paper.

6. The belt transfer type multi-function device of claim 5, wherein the control device compares a first detection value detected by the security paper detection sensor at a time point at which there is no corresponding paper near the security paper detection sensor with at least one second detection value detected by the security paper detection sensor for paper to be determined on the transfer path during a process in which the paper to be determined is transferred on the transfer path, and the control device determines that the corresponding paper is security paper if a comparison value is equal to or greater than a predetermined reference, and the control device determines that the corresponding paper is plain paper if the comparison value is smaller than the predetermined reference.

7. A control method of a belt transfer type security multi-function device, which determines whether paper fed on a transfer path of paper starting from a paper tray is security paper or plain paper and prints an image transferred to a belt on paper moving between a transfer roller and a belt roller, the control method comprising:
    printing an image to be printed on security paper already caught between the transfer roller and the belt roller as it is;
    stopping, if next paper is determined as plain paper along a movement direction of paper, movement of the plain paper on the transfer path of paper before the plain paper is caught between the transfer roller and the belt roller so that the image, which is already transferred to the transfer belt and which is to be printed on the plain paper along the movement direction of paper, is not printed on the plain paper;
    deleting the image already transferred to the transfer belt in a state in which the plain paper stopped on the transfer path of paper is maintained; and
    subsequently ejecting the stopped plain paper, as blank paper, through a ejection port of printed paper along the transfer path of paper,
    wherein the plain paper is controlled to be stopped from moving before being caught between the transfer roller and the belt roller, after picked up by a pickup roller, and wherein at least one of a feed roller and a registration roller for correcting a skew of fed paper and a driving unit including a clutch or a motor for driving a corresponding roller is provided between the pickup roller and the transfer roller, and the driving unit is controlled to stop movement of the plain paper before the plain paper is caught between the transfer roller and the belt roller.

8. The control method of claim 7, wherein
printing is normally performed on the security paper already caught between the transfer roller and the belt roller by turning off a clutch of the feed roller, and the plain paper is ejected as blank paper by turning on the clutch of the feed roller after the lapse of a predetermined time.

9. The control method of claim 8, wherein:
a second feed clutch switch connected to the clutch of the feed roller and a first feed clutch switch and a printer feed clutch switch connected to the second feed clutch switch are additionally provided, and
ON/OFF of the first feed clutch switch and the second feed clutch switch is controlled.

10. The control method of claim 8, wherein
the stopped plain paper is ejected as blank paper through the ejection port along the transfer path of paper by controlling ON/OFF of each of a door open sensor switch, a feed sensor switch, an exit sensor switch, and a bin full sensor switch.

11. The control method of claim 7, wherein a first detection value detected by a security paper detection sensor at a time point at which there is no corresponding paper near the security paper detection sensor is compared with at least one second detection value detected by the security paper detection sensor for paper to be determined on the transfer path during a process in which the paper to be determined is transferred on the transfer path, and corresponding paper is determined as security paper if a comparison value is equal to or greater than a predetermined reference, and the corresponding paper is determined as plain paper if the comparison value is smaller than the predetermined reference.

* * * * *